US005470418A

United States Patent [19]
Instance

[11] Patent Number: 5,470,418
[45] Date of Patent: Nov. 28, 1995

[54] METHOD AND APPARATUS FOR PRODUCING LABELS

[76] Inventor: David J. Instance, Guinea Hall, Sellindge, Kent, United Kingdom

[21] Appl. No.: 280,804

[22] Filed: Jul. 26, 1994

Related U.S. Application Data

[63] Continuation of Ser. No. 471,066, Jan. 29, 1990, abandoned, which is a continuation of Ser. No. 135,367, Dec. 21, 1987, abandoned.

[30] Foreign Application Priority Data

Dec. 22, 1986 [GB] United Kingdom .................... 8630545

[51] Int. Cl.[6] .................................................... B32B 31/00

[52] U.S. Cl. .......................... 156/231; 156/246; 156/248; 156/249; 156/267; 156/289; 156/301

[58] Field of Search .................................... 156/230, 231, 156/246, 247, 248, 249, 251, 267, 268, 289, 299, 300, 301, 302, 303; 283/81; 428/202, 203, 352

[56] References Cited

U.S. PATENT DOCUMENTS

| | | | |
|---|---|---|---|
| 3,860,473 | 1/1975 | Wesen | 156/267 |
| 3,869,328 | 3/1975 | Instance | 156/285 |
| 4,153,496 | 2/1978 | Swift . | |
| 4,328,057 | 6/1980 | Gutow . | |
| 4,359,358 | 11/1982 | Hattemer | 156/301 |
| 4,488,922 | 12/1984 | Instance | 156/301 |
| 4,528,055 | 7/1985 | Hattemer | 156/247 |
| 4,594,125 | 6/1986 | Watson | 156/267 |
| 4,744,591 | 5/1988 | Instance | 283/81 |
| 4,946,532 | 8/1990 | Freeman | 156/244.18 X |

FOREIGN PATENT DOCUMENTS

| | | |
|---|---|---|
| 0161914 | 5/1985 | European Pat. Off. . |
| 2211995 | 3/1972 | Germany . |
| 3431239 | 8/1984 | Germany . |
| 1029856 | 9/1963 | United Kingdom . |
| 1420933 | 3/1972 | United Kingdom . |
| 2152005 | 12/1983 | United Kingdom . |

*Primary Examiner*—Mark A. Osele
*Attorney, Agent, or Firm*—Rothwell, Figg, Ernst & Kurz

[57] ABSTRACT

A method of producing a succession of self-adhesive labels on a length of release material, which method comprises the steps of:

(a) applying a layer of pressure-sensitive adhesive to a surface of a length of release material;

(b) applying a succession of individual labels to the layer of pressure-sensitive adhesive so as to adhere the labels to the release material;

(c) cutting through each of the labels and the layer of pressure-sensitive adhesive as far as the release material thereby to form the required self-adhesive labels; and (d) removing the waste portions of the applied labels and the waste portions of the pressure-sensitive adhesive which surround the self-adhesive labels from the release material. The present invention also provides apparatus for producing such self-adhesive labels.

7 Claims, 8 Drawing Sheets

METHOD AND APPARATUS FOR PRODUCING LABELS

This is a continuation of application Ser. No. 07/471,066, filed Jan. 29, 1990, now abandoned, which is a continuation of application Ser. No. 135,367, filed Dec. 21, 1987, now abandoned.

BACKGROUND OF THE INVENTION

The present invention relates to a method and an apparatus for producing labels. In particular, the present invention relates to the production of a succession of self-adhesive labels carried on a release material.

In the packaging field there is a great demand for high quality pre-printed labels for labelling containers of various types. In order to facilitate the packaging and labelling of containers at a fast rate it is generally required that the labels to be attached to the containers be made available in a form in which they are easy to handle and easy to transfer onto the containers for which they are intended. In one convenient arrangement the labels are self-adhesive labels which are carried in series on a web of release material which is wound into a reel.

It is well known in the art to produce reels of self-adhesive labels carried on a release paper for transfer of the labels from the release paper to a container to be labelled.

One process for producing such labels is described in my company's British Patent No. 1420933. This patent describes a process for the production of a continuous reel of self-adhesive labels, wherein the labels are produced as separate flat sheets cut to finished size and stacked, the separate labels are then fed in succession from the stack onto the periphery of a drum and held thereon by vacuum means while being fed to an applicator by which they are coated individually on their reverse sides with a pressure-sensitive adhesive composition, the adhesive is dried by passing the labels through a hot air chamber extending around a substantial part of the periphery of the drum, and the labels are applied successively by their adhesive coated sides to a continuous web of release paper which moves against said drum and which is then reeled.

However this process has certain disadvantages in that it is difficult to produce a continuous reel of self-adhesive labels in which there is a regular gap between adjacent labels. Generally it is preferred to have a regular gap for ease of application of the labels to containers in a continuous labelling process. The reason for this difficulty is that it is not readily possible to place each successive label accurately onto the periphery of the rotating drum and then subsequently to transfer the labels accurately from the drum to the moving web of release paper to obtain a regular spacing between adjacent labels on the release paper. In addition, accurate alignment of the labels on the release paper can be difficult to achieve because of the difficulties mentioned above which are encountered when transferring the labels from the stack of labels to the release paper. This can result in some of the labels being skew relative to other labels on the reel of release paper. When the labels are subsequently applied to containers from the reel, any labels which are in a skew position on the reel of release paper are inevitably transferred in an out-of-true condition and are therefore mis-aligned on the container to which they are attached. This is unacceptable as it renders the product so labelled unattractive to the consumer.

A further disadvantage of this process is that after coating the reverse sides of the labels with pressure-sensitive adhesive, drying the adhesive and applying the labels by their adhesive coated sides to the continuous web of release paper, one frequently obtains surplus adhesive appearing around the periphery of the labels on the release paper. When the release paper is wound into a reel this surplus adhesive adheres to the back of the adjacent layer of release paper and can subsequently interfere with the unwinding of the reel and the application of the labels to containers to be labelled.

European Patent Specification No. 0098092 discloses a method and apparatus for producing labels which attempt to overcome these disadvantages by arranging for the peripheral portions of labels applied to a support web to be removed after the labels have been applied to the support web and before the labels are wound into a reel. While the method and apparatus disclosed in that specification did overcome those disadvantages, nevertheless it was necessary to adhere the labels to an intermediary support web. The requirement for a support web increases the cost of production of the self-adhesive labels.

It is an aim of the present invention to provide a method and apparatus for producing labels which does not require a support web to which individual labels are adhered, such as those support webs which are disclosed in those two specifications referred to above.

SUMMARY OF THE INVENTION

Accordingly, the present invention provides a method of producing a succession of self-adhesive labels on a length of release material, which method comprises the steps of:

(a) applying a layer of pressure-sensitive adhesive to a surface of a length of release material;

(b) applying a succession of individual labels to the layer of pressure-sensitive adhesive so as to adhere the labels to the release material;

(c) cutting through each of the labels and the layer of pressure-sensitive adhesive as far as the release material thereby to form the required self-adhesive labels and (d) removing the waste portions of the applied labels and the waste portions of the pressure-sensitive adhesive which surround the self-adhesive labels from the release material.

Preferably, the method further comprises the step of applying to the succession of labels on the release material which is formed in step (b) a web of self-adhesive laminar material whereby the laminar material is adhered by the self-adhesive surface thereof over the succession of labels and the layer of pressure-sensitive, adhesive and the laminar material is cut in cutting step (c) whereby each self-adhesive label incorporates a coextensive portion of the laminar material and in step (d) that part of the laminar material which surrounds the self-adhesive labels is pulled away from the release material and thereby removes from the release material the said waste portions of the applied labels and pressure-sensitive adhesive which are adhered to the laminar material.

In another arrangement, succession of individual labels is carried on a web of self-adhesive laminar material, a front face of each label being adhered to the self-adhesive surface of the laminar material, and wherein in cutting step (c) the laminar material is cut whereby each self-adhesive label incorporates a coextensive portion of the laminar material and in step (d) that part of the laminar material which surrounds the self-adhesive labels is pulled away from the release material and thereby removes from the release material the said waste portions of the applied labels and pressure-sensitive adhesive which are adhered to the laminar material.

The self-adhesive material may be a self-adhesive transparent plastics web.

Alternatively, before removing step (d) the pressure-sensitive adhesive is in the form of a coherent film which can be pulled away from the release material without tearing.

Preferably, in removing step (d) the said waste portions are removed from the release material by pulling away from the release material the waste portion of the film of pressure-sensitive adhesive, and the label waste portions which are adhered thereto.

More preferably, the waste portion of the film of pressure-sensitive adhesive is separated from the release material by means of a suction roller which sucks the film away from the release material.

Alternatively, the waste portion of the film of pressure-sensitive adhesive is separated from the release material by being pulled against a silicone coated roller.

Desirably, air is blown between the separating surfaces of the release material and the film of pressure-sensitive adhesive thereby to aid separation thereof.

In a further alternative method, the method further comprises the step of applying to the layer of pressure-sensitive adhesive on opposing sides of the succession of labels a pair of elongate strips, and in removing step (d) the strips are pulled away from the release material and thereby remove from the release material the said waste portions of the applied labels and pressure-sensitive adhesive which are adhered thereto.

Preferably, in removing step (d) the said waste portions of the applied labels and the pressure-sensitive adhesive are removed from the release material by suction by means of a suction device.

Optionally, the method further comprises the step of applying to the succession of cut labels on the release material which is formed in step (c) an elongate web whereby the elongate web is adhered to the release material by those parts of the layer of pressure-sensitive adhesive which are not covered by the applied labels, and wherein in removing step (d) the elongate web is pulled away from the release material and thereby removes from the release material the said waste portions of the pressure-sensitive adhesive which are adhered thereto and the waste portions of the applied labels.

In a particular alternative arrangement, the layer of pressure-sensitive adhesive is applied in the form of a succession of patches and each label is applied to a respective patch, the size of each patch being greater than the respective applied label whereby each label is surrounded by a respective waste portion of the pressure-sensitive adhesive.

The present invention further provides an apparatus for producing a succession of self-adhesive labels on a length of release material, which apparatus comprises means for applying a layer of pressure-sensitive adhesive to a surface of a length of release material, means for applying a succession of individual labels to the layer of pressure-sensitive adhesive so as to adhere the labels to the release material; a cutting device for cutting through each of the labels and the layer of pressure-sensitive adhesive as far as the release material thereby to form the required self-adhesive labels; and means for removing the waste portions of the applied labels and the waste portions of the pressure-sensitive adhesive which surround the self-adhesive labels from the release material.

BRIEF DESCRIPTION OF THE DRAWINGS

Embodiments of the present invention will now be described by way of example only with reference to the accompanying drawings, in which.

DESCRIPTION OF THE PREFERRED EMBODIMENTS

Figure 1:
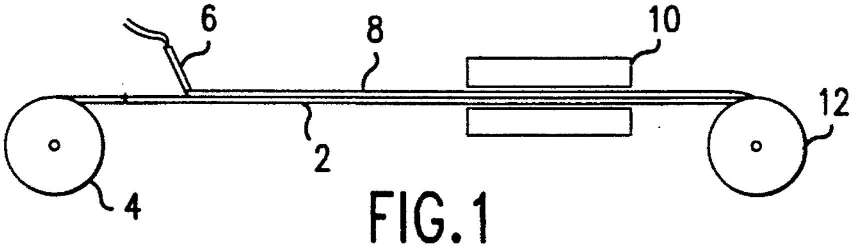
FIG. 1 is a diagrammatic elevation of an apparatus for applying a pressure-sensitive adhesive to a release material for use in the present invention.

Referring to FIG. 1, a web of siliconised release material 2, being either paper or plastics, is fed out from a reel 4 thereof underneath an adhesive coating head 6. The upper surface of the release material 2 is siliconised. The coating head 6 applies to the upper surface of release material 2 a layer of pressure-sensitive adhesive 8 which coats the whole of the upper surface of the release material 2. The pressure-sensitive adhesive may be either a hot-melt pressure-sensitive adhesive or a solvent-based pressure-sensitive adhesive. Hot-melt pressure-sensitive adhesives are "cured", i.e. allowed to thicken and solidify, by cooling and solvent-based pressure-sensitive adhesives are "cured" by evaporation of the solvent therefrom. In the illustrated arrangement, the apparatus is adapted for use with a hot-melt pressure sensitive adhesive and the coated web of release material 2 is passed through a cooling station 10 in which the hot-melt pressure-sensitive adhesive is "cured" by cooling e.g. by being subjected to cold air. The "cured" adhesive is still tacky. The resultant coated web is then wound up into a reel 12 for subsequent use. In the illustrated arrangement, the lower surface of the release material 2 is also siliconised so as to ensure that adjacent parts of the reel are not permanently adhered together by the pressure-sensitive adhesive and that the reel 12 can be subsequently unwound. In an alternative arrangement the lower surface of the release material 2 is left unsiliconised and a web of release paper is disposed over the pressure-sensitive adhesive and wound concentrically therewith in the reel 12 for the same purpose. When the latter reel is subsequently unwound, the web of release paper is separated from the pressure-sensitive adhesive-coated release material 2 and discarded.

Figure 3:
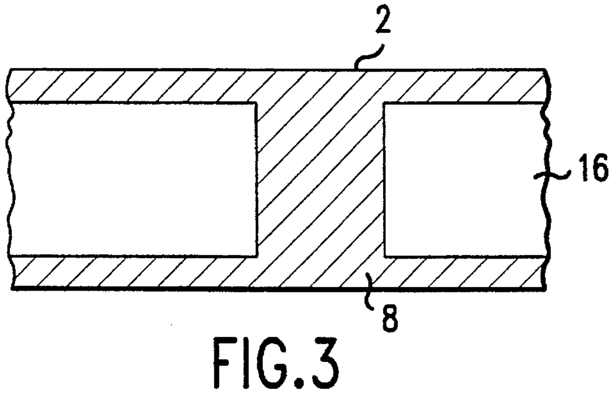
FIG. 3 is a plan view of an assembly of the pressure-sensitive adhesive-coated release material of FIG. 1 and an applied label, which assembly is produced in a part of the apparatus of FIG. 2.
Figure 2:
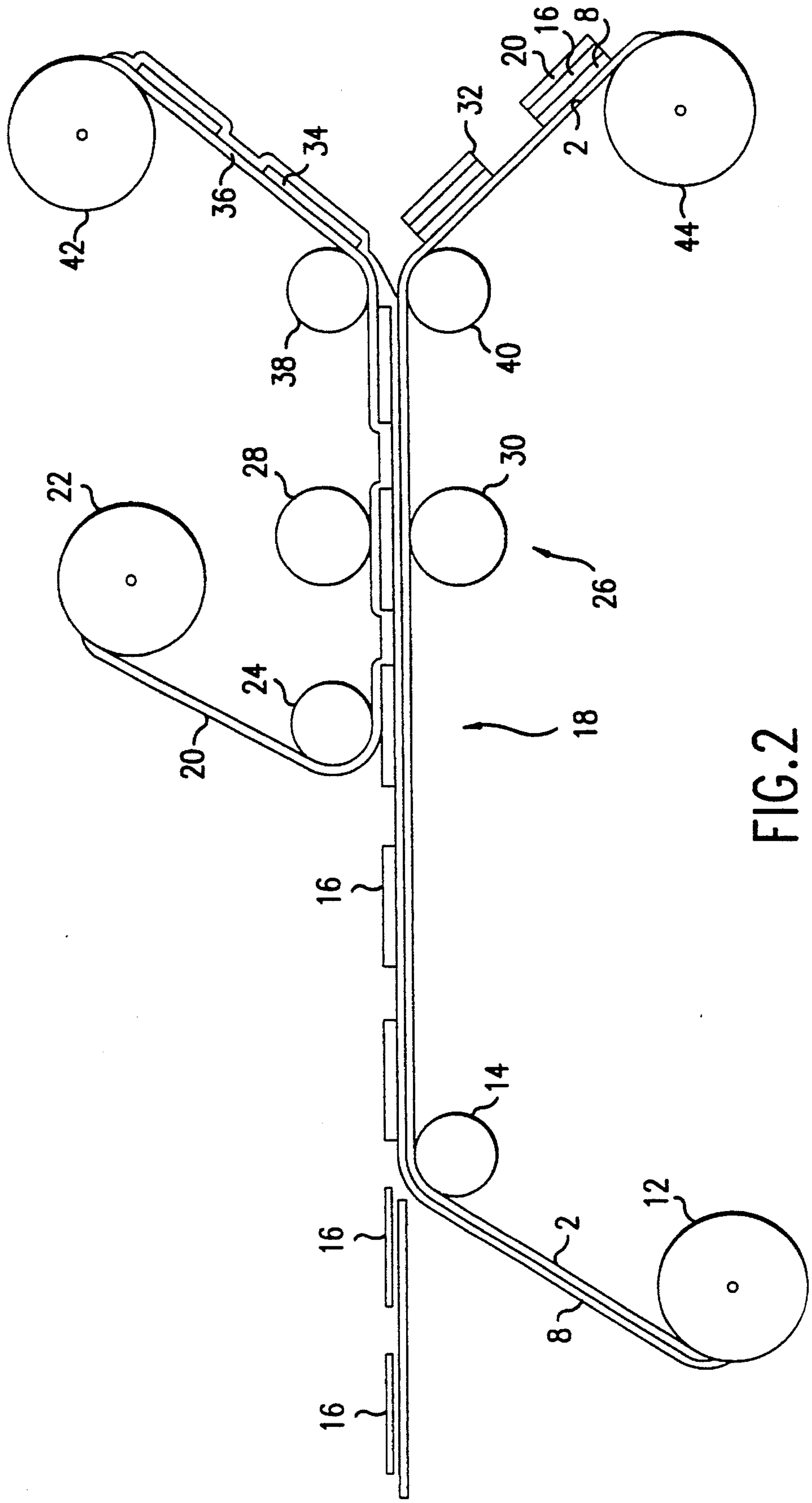
FIG. 2 is a diagrammatic elevation of an apparatus for producing self-adhesive labels in accordance with a first embodiment of the present invention.

FIG. 2 shows an apparatus for producing self-adhesive labels, which are carried on the release material which has been coated by the apparatus of FIG. 1, in accordance with a first embodiment of the present invention. The release material 2 with the applied layer of pressure-sensitive adhesive 8 is fed out from the reel 12 thereof, with any co-wound release paper being unwound simultaneously and discarded. The pressure-sensitive adhesive-coated release material 2 is passed over a roller 14 with the layer of pressure-sensitive adhesive 8 uppermost and remote from the roller 14. A succession of labels 16 are fed onto the pressure-sensitive adhesive-coated upper surface of the moving web of release material 2 so that a row of the labels 16 is adhered by the still tacky pressure-sensitive adhesive to the release material 2. The labels 16 are fed by a label feed device which is know per se, such as that which is described in European Patent Specification No. 0098092 or in British Patent Specification No. 2164915. Typically, the labels 16 are sheets which have been lithographically printed on their upper surface. FIG. 3 shows how the labels 16 are deposited in a row on the layer of pressure-sensitive adhesive 8 which coats the release material 2. The dimensions of the labels 16 and their relative spacing may be varied as desired.

Figure 4:
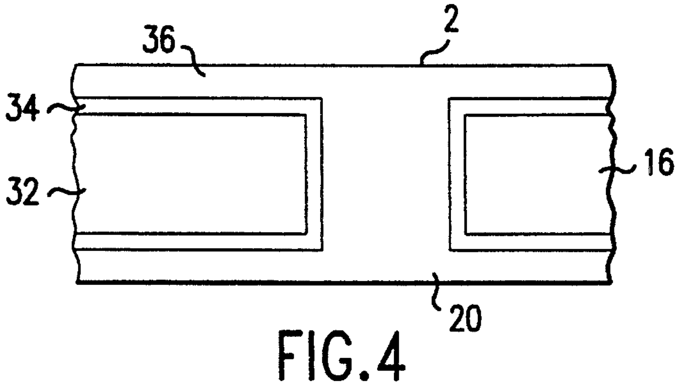
FIG. 4 is a plan view of the assembly of FIG. 3 which has had a layer of laminar material applied thereover, and has been subsequently die-cut, by the apparatus of FIG. 2.

The assembly of labels 16 on the release material is then passed to laminar material applying station 18 at which a laminar material 20, which is coated on one side with a pressure-sensitive adhesive, is fed out from a reel 22 thereof to a roller 24. Generally, the self-adhesive laminar material is carried on a length of release backing material (not shown) and as the composite web of release backing material/release backing material is fed out from the reel 22 the release backing material is stripped away from the self-adhesive surface of the laminar material 20. Preferably, the laminar material 20 is a layer of transparent self-adhesive plastics material, such as polyester, a low density polyethylene, or polypropylene, and is typically in a thickness of around 12 microns. That surface of the laminar material 20 which is coated with the pressure-sensitive adhesive is remote from the roller 24 and the other surface is disposed against the roller 24. The roller 24 is positioned so that it urges the pressure-sensitive adhesive surface of the laminar material 20 against the upper surface of the assembly of the labels 16 and the release material 2 whereby the laminar material 20 is adhered thereto. The composite assembly then passed to a die-cutting station 26 which comprises an upper die-cutting roller 28 and a lower backing roller 30. The assembly passes between the die-cutting roller 28 and the backing roller 30. The die-cutting roller 28 is adapted to cut through the laminar material 20, the adhered labels 16 and the layer of pressure-sensitive adhesive 8 as far as the release material 2 so as to cut from each adhered label 16 a central self-adhesive label 32 of required shape and dimensions which is covered by a coextensive laminar material 20 and is carried on the release material 2. Thus the die-cutter 28 cuts a succession of self-adhesive labels 32 which are carried on the release material. The resultant assembly of die-cut labels 32 is shown in FIG. 4. Each die-cut label 32 is surrounded by a peripheral label waste portion 34 and a waste remnant 36 of the web of laminar material.

Figure 5:
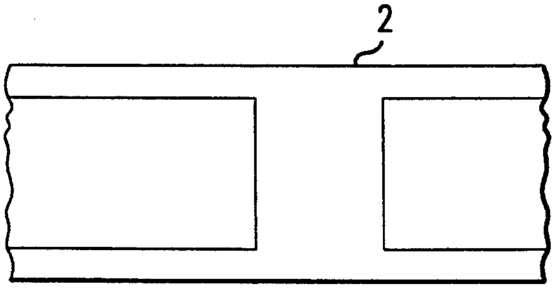
FIG. 5 is a plan view of the assembly of FIG. 4 after the waste web remnant produced by the die-cutting step has been removed by the apparatus of FIG. 2 thereby to form a series of self-adhesive labels carried on a release material.

The resultant assembly is then passed to a waste removal section at which the waste material, consisting of the waste portions 34 and the waste remnant 36 to which the waste portions 34 are adhered by the self-adhesive surface of the laminar material 20, are removed from the release material 2 by passing the composite web between a pair of opposed rollers 38, 40 thereby to leave a succession of self-adhesive labels 32 on the release material 2. Each self-adhesive label 32 consists of a three ply laminate of laminar material 20/label 16/layer of pressure-sensitive adhesive 8. FIG. 5 shows the succession of self-adhesive labels 32 which are carried on the release material 2. The waste material is pulled upwardly away from the release material 2. As the waste laminar material 20 is separated from the release material 2, the pressure-sensitive adhesive-coated surface of the laminar material 20 pulls the adjacent layer of pressure-sensitive adhesive 8 away from the release material 2 also since the layer of pressure-sensitive adhesive 8 has greater adhesion to the pressure-sensitive adhesive-coated surface of the laminar material 20 than to the release material 2. Similarly and for the same reason the peripheral label waste portions 34 pull the adjacent layer of pressure-sensitive adhesive 8 away from the release material 2. Accordingly, the self-adhesive labels 32 on the release material 2 are not surrounded by the layer of pressure-sensitive adhesive 8 since those parts of that layer 8 which surround the self-adhesive labels 32 have been removed from the release material 8 in the waste removal step. The waste consists of the waste remnant 36 of the laminar material 20, the peripheral label waste portions 34 and those parts of the layer of pressure-sensitive adhesive 8 which are adjacent thereto. The waste is wound onto a reel 42 for subsequent disposal. The release material 2 with the succession of self-adhesive labels 32 thereon is also wound into a reel 44 which can be subsequently placed in an automatic labelling apparatus for automatic application of the self-adhesive labels 32 to products to be labelled.

The method described above can produce high quality, lithographically printed self-adhesive labels in an efficient and cost effective manner by obviating the need for the individually printed labels to be adhered to a self-adhesive support web. Furthermore, the preferred self-adhesive labels have a top layer of a transparent plastics laminar material which both protects the lithographically printed label from damage or soiling and also enhances the visual appearance of the self-adhesive label.

Figure 6:
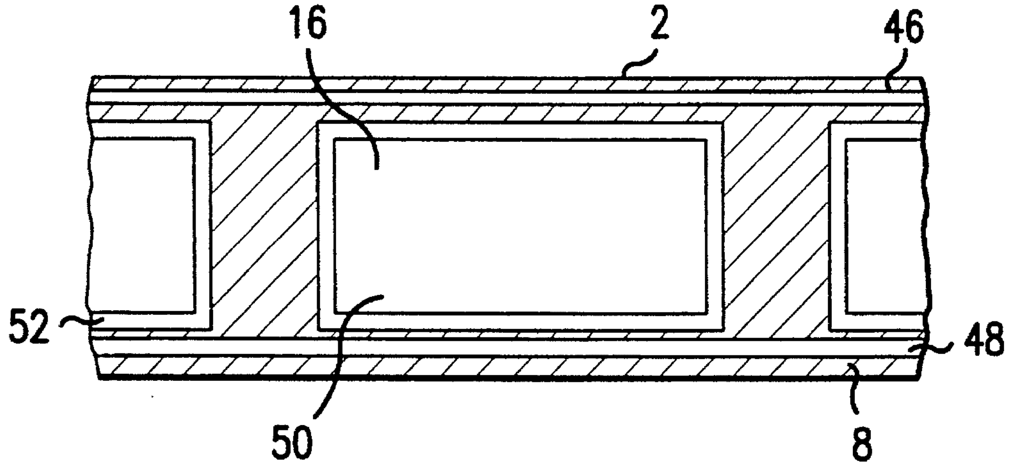
FIG. 6 is a plan view of the assembly of FIG. 3 which has had a pair of elongate strips applied thereover and has been die-cut by a die cutter in accordance with a second embodiment of the present invention.
Figure 7:
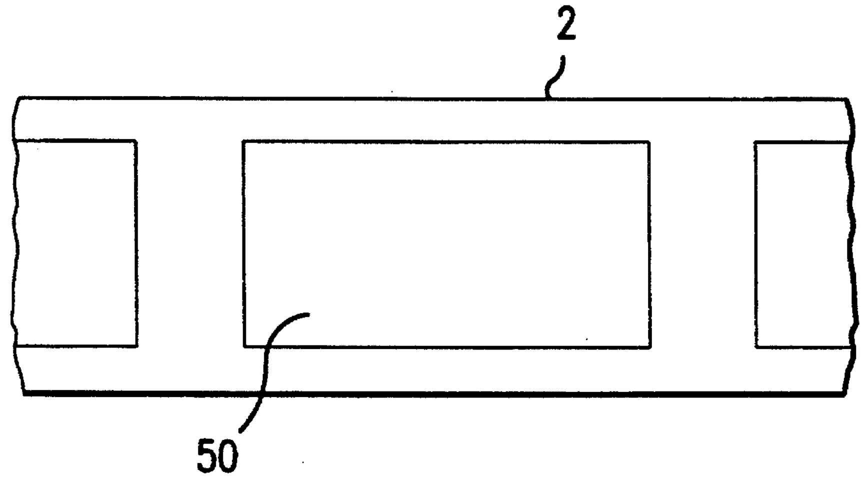
FIG. 7 is a plan view of the assembly of FIG. 6 after the waste web remnant produced by the die-cutting step has been removed thereby to form a series of self-adhesive labels carried on a release material.

An alternative embodiment of the present invention will now be described with reference to FIGS. 6 and 7. In this embodiment, the laminar material 20 is replaced by a pair of elongate strips 46, 48 e.g. of paper or plastics which are adhered to the release material 2 on respective longitudinal sides of the succession of adhered labels 16 by the layer of pressure-sensitive adhesive 8. The strips 46, 48 are pressed into adhesive contact with the layer of pressure-sensitive adhesive 8 by the roller 24 so that each strip 46, 48 extends along a respective longitudinal edge of the release material 2. The composite assembly is then die-cut by the die-cutting roller 28 in the same manner as in the embodiment described above and the resultant assembly of die-cut labels on the release backing material 2 is shown in FIG. 6. Each die-cut label 50 is surrounded by a peripheral label waste portion 52 and these are adhered to the release material 2 by the layer of pressure-sensitive adhesive 8. The layer of pressure-sensitive adhesive 8 also adheres the two strips 46, 48 to the release material 2.

The pressure sensitive adhesive employed for the layer 8 is chosen and processed e.g. cooled such that after the die-cutting step the layer forms a strong coherent film which is resistant to tearing. When the composite die-cut web is passed between the pair of rollers 38, 40, the waste consisting of the strips 46, 48, the peripheral label waste portions 52 and those parts of the layer of pressure-sensitive adhesive 8 which surround the die-cut labels 50 is stripped off the release material 2 and wound up into a reel. The succession of die-cut labels 50 on the release material is wound up into a reel for subsequent insertion into an automatic labelling machine. The strips 46, 48 act as carriers for the waste part of the layer of pressure-sensitive adhesive 8 and the peripheral label waste portions 52 are carried by the waste part of the layer of pressure-sensitive adhesive 8. The strips 46, 48 enhance the tear strength of the waste so as to enable it to be pulled away from the release material 2 and wound up into a reel. The strips 46, 48 are employed to reinforce and strengthen the pressure-sensitive adhesive film which is removed from the release material 2.

This embodiment of the present invention can efficiently produce self-adhesive lighrographically printed labels which are not coated with a laminar material as in the earlier described embodiment. Such labels are desired in particular labelling applications.

Figure 8:
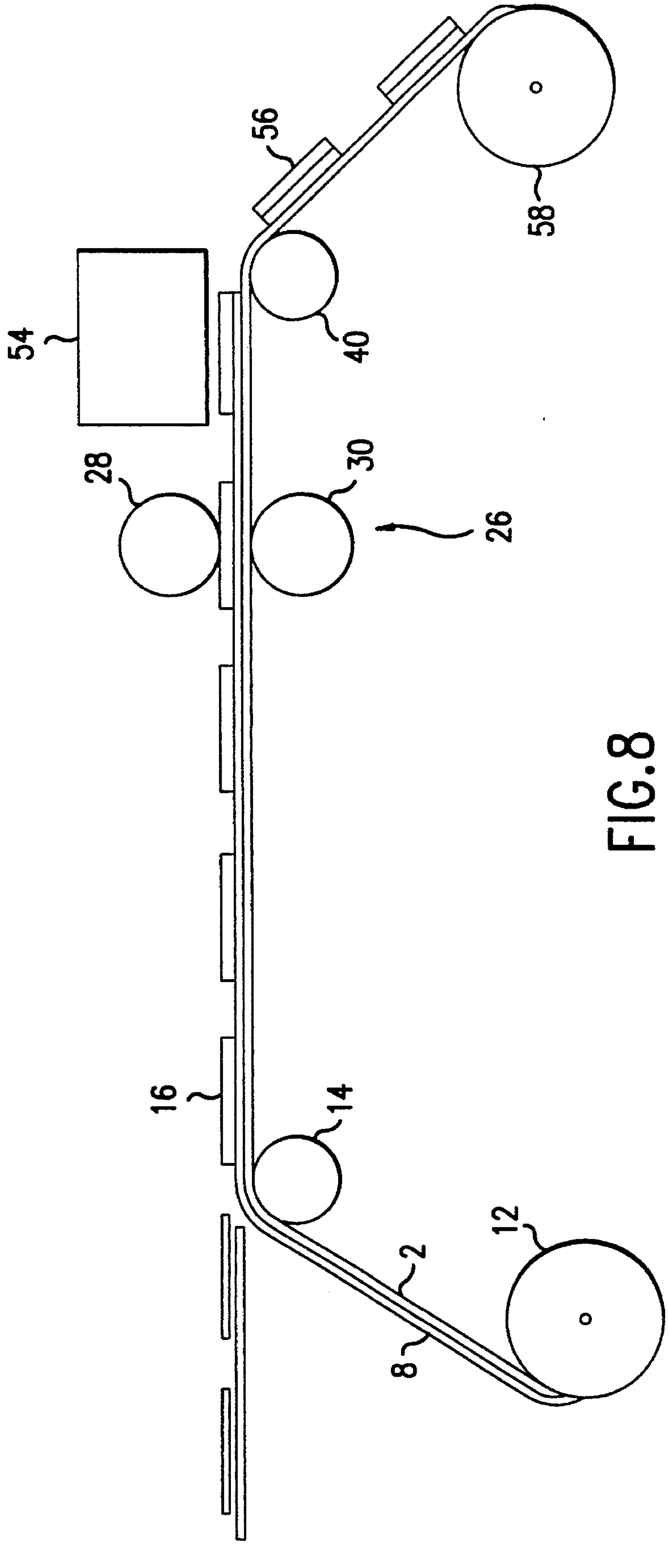
FIG. 8 is a diagrammatic elevation of an apparatus for producing self-adhesive labels in accordance with a third embodiment of the invention.

FIG. 8 shows a further embodiment of an apparatus for producing labels in accordance with the present invention. The apparatus is similar to that shown in FIG. 2 except that the laminar material applying station 18, and in particular roller 24 of FIG. 2 are dispensed with; the upper roller 38 of the pair of opposed rollers 38, 40 of FIG. 2 is also dispensed with; and a suction device, referred to hereinafter as a vacuum box 54 is positioned above the composite web down-stream of the die-cutting station 26. With this apparatus, the reel 12 of release material 2 which is coated with the layer of pressure-sensitive adhesive 8 is passed over the roller 14. At this point, individual lithographically printed labels 16 are applied in succession to the moving web so that they are releasably adhered to the release material 2 by the layer of pressure-sensitive adhesive 8. The composite assembly then passes to the die-cutting station 26 consisting of the die-cutting roller 28 and the backing roller 30. The die-cutting roller 28 cuts out a die-cut self-adhesive label 56 from each of the applied labels 16. Each of the die-cut labels 56 is surrounded by a peripheral waste label portion and waste pressure-sensitive adhesive on the release material. The die-cut assembly then passes under the vacuum box 54 which sucks up the waste pressure-sensitive adhesive and the associated peripheral waste label portions leaving on the release material 8 the succession of die-cut self-adhesive labels 56. The resultant succession of labels 56 on the release material is passed over roller 40 and wound up into a reel 58 for subsequent application of the labels to products or containers in an automatic labelling machine. This embodiment obviates the need for a laminar material or strips to ensure removal of the excess pressure-sensitive adhesive and provides an efficient and cost-effective method of producing self-adhesive labels.

Figure 9:
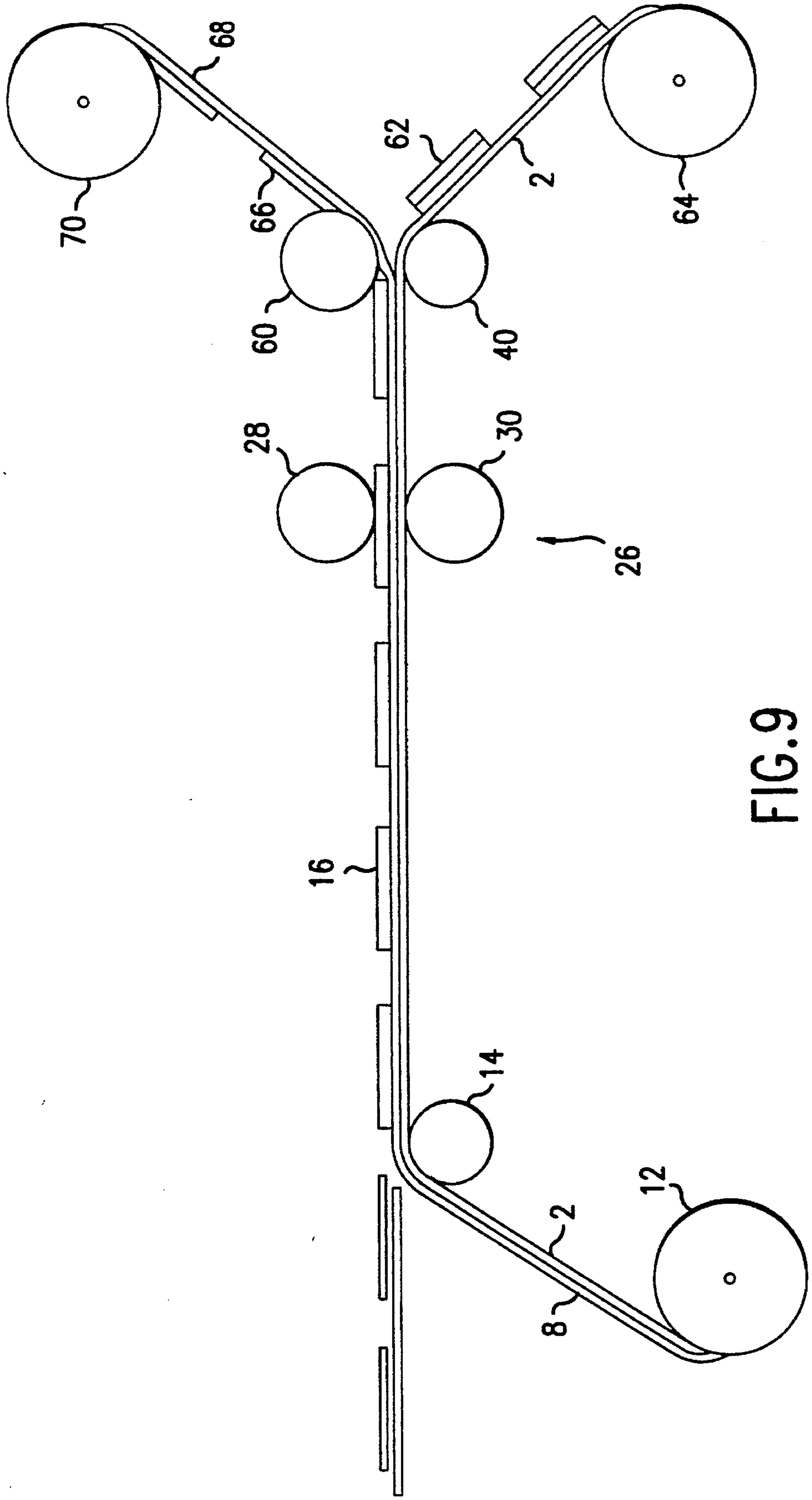
FIG. 9 is a diagrammatic elevation of an apparatus for producing self-adhesive labels in accordance with a fourth embodiment of the present invention.

FIG. 9 shows a still further embodiment of an apparatus for producing labels in accordance with the present invention. The apparatus of FIG. 9 is similar to that of FIG. 8 except that the vacuum box 54 of FIG. 8 is substituted by a silicone covered roll 60 which is mounted in opposition to roller 40. The waste which is produced in the die-cutting step by the action of the die-cutting roller 28 is pulled upwardly against the silicone covered roll 60 and away from the release material 2 carrying thereon the succession of self-adhesive labels 62 and is wound up into a reel 64. Since the roll 60 is silicone covered the pressure-sensitive adhesive does not adhere strongly to the roll 60 and can be easily pulled off the roll 60. Again, as for the embodiment of FIGS. 6 and 7 the layer of pressure-sensitive adhesive 8 would have to be in the form of a strong coherent film which is resistant to tearing so that it can be pulled continuously off the release material 2 and wound up into a reel. The peripheral waste label portions 66 which are formed in the die-cutting step are carried away from the release material 2 by the waste pressure-sensitive adhesive 68 and wound into a reel 70 to leave a succession of the self-adhesive labels 62 on the release material 2 which are subsequently wound into the reel 64. In a modification of this apparatus the silicone covered roll 60 is also a vacuum roll which sucks the waste material against its surface. This aids the removal of the waste from the release material 2.

Figure 10:
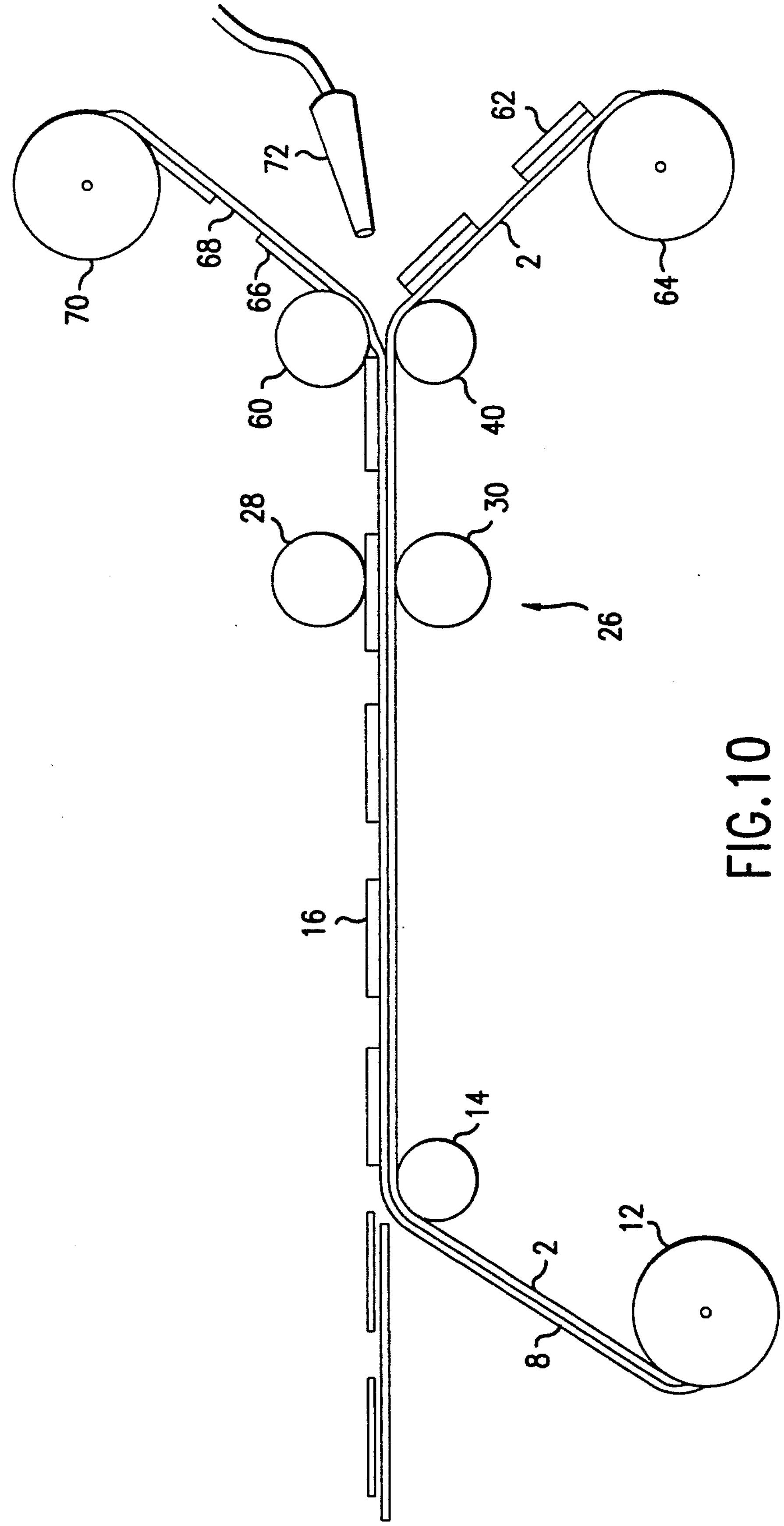
FIG. 10 is a diagrammatic elevation of an apparatus for producing self-adhesive labels in accordance with a fifth embodiment of the present invention.

FIG. 10 shows an adaptation of the arrangement of FIG. 9 in which an air blower 72 is arranged to blow air into the region where the waste pressure sensitive adhesive 68 and peripheral waste label portions 66 are being stripped from the release material 2. The air blast helps to assist the delamination of the waste pressure-sensitive adhesive 68 from the release material 2 and thereby reduces the possibililty of the waste pressure-sensitive adhesive 68 tearing when it is under tension.

Figure 11:
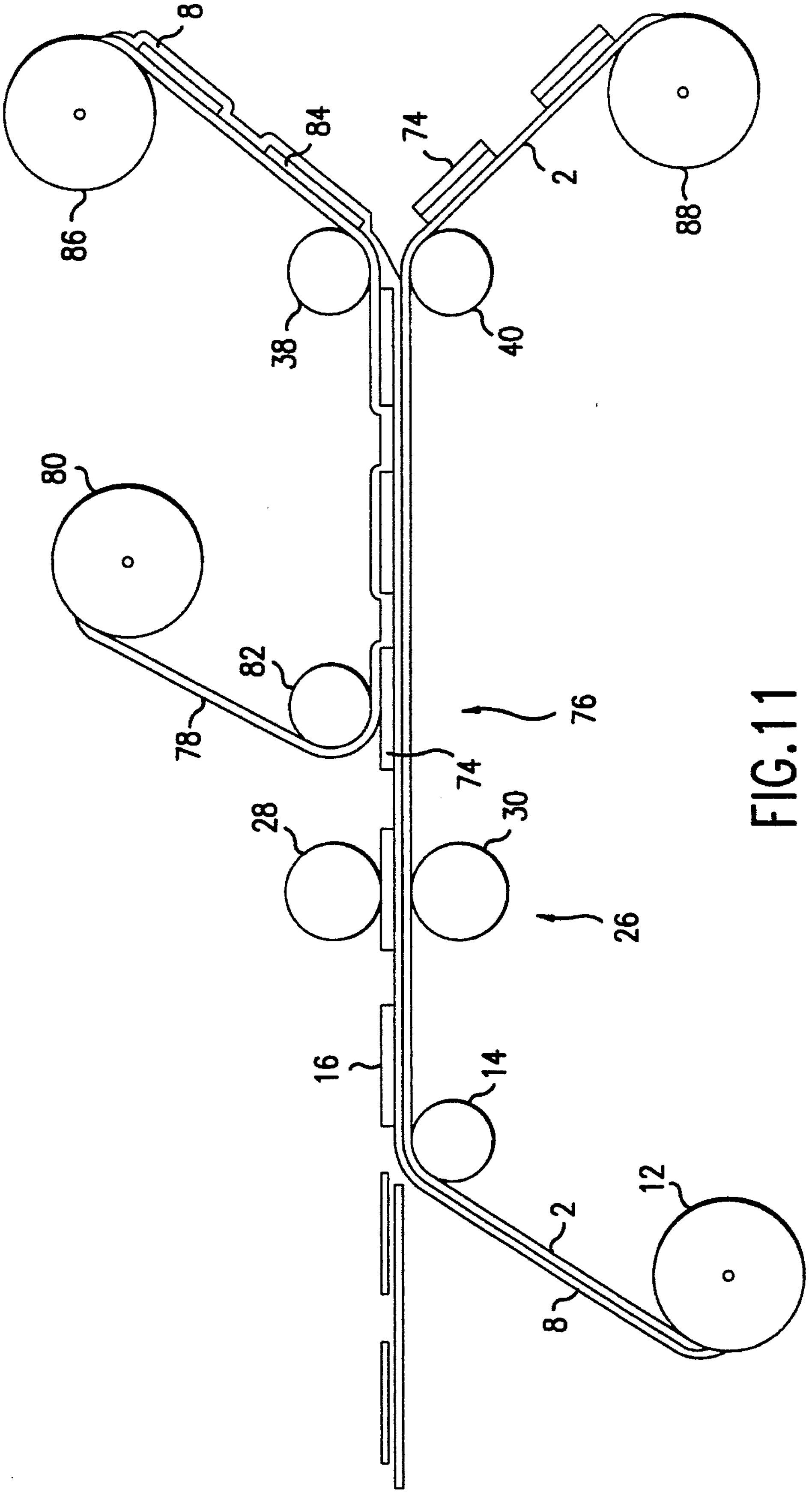
FIG. 11 is a diagrammatic elevation of an apparatus for producing self-adhesive labels in accordance with a sixth embodiment of the present invention.

FIG. 11 shows yet another embodiment of an apparatus for producing labels in accordance with the present invention. In this embodiment, a web of paper or other material is employed to remove waste pressure-sensitive adhesive from the release material 2. The release material 2 with the layer of pressure-sensitive adhesive 8 is fed out from the reel 12 thereof, over the roller 14 at which the succession of labels 16 are applied thereto, and to the die-cutting station 26 at which the die-cutting roller 28, which is backed by backing roller 30, cuts from the succession of labels 16 a succession of self-adhesive labels 74 in the manner described above. The die-cut assembly is then conveyed to a paper web applying station 76. At the paper web applying station 76 a paper web 78 from a reel 80 thereof is applied over the assembly of the die-cut labels 74 on the release material 2 by a roller 82. The paper web 78 covers the die-cut labels 74, the peripheral label waste portions 84 and those parts of the layer of pressure-sensitive adhesive 8 which are not covered by the labels 16. The composite assembly then passes to the pair of opposed rollers 38, 40 at which the paper web 76 is pulled away from the release material 2 and is wound up into a reel 86. Since the pressure-sensitive adhesive 8 which surrounds the die-cut labels 74 adheres more strongly to the paper web 78 than to the release material 2, the paper web 78 pulls the waste pressure-sensitive adhesive 8 away from the release material 2. In addition, the pressure-sensitive adhesive 8 is formulated and processed so as to form a coherent film so that when the waste pressure-sensitive adhesive 8 is pulled away from the release material 2 the peripheral waste label portions 84, and the associated pressure-sensitive adhesive 8, which surround the self-adhesive die-cut labels 74 are also pulled away from the release material 2 together with the paper web 78. In this way, a succession of self-adhesive die-cut labels 76 are left on the release material which is subsequently wound up into a reel 88.

In an alternative arrangement of this embodiment, the paper web 78 is applied before the die-cutting step, but in this alternative arrangement the die-cutter cuts from the paper web 78 a number of individual pieces which correspond in shape and dimensions to the die-cut labels 74 since the die-cutter 28 must cut through the paper web 74 to die-cut the labels 74. Accordingly, this alternative is less convenient than the former arrangement since it is necessary to remove the individual pieces as well as the waste web which is wound up into the reel 86.

This embodiment has the advantage that the paper web which is employed to remove the excess pressure-sensitive adhesive can be very inexpensive and thus the embodiment provides an efficient and cost-effective method of continuously producing high quality lithographically printed self-adhesive labels in reel form.

Figure 12:
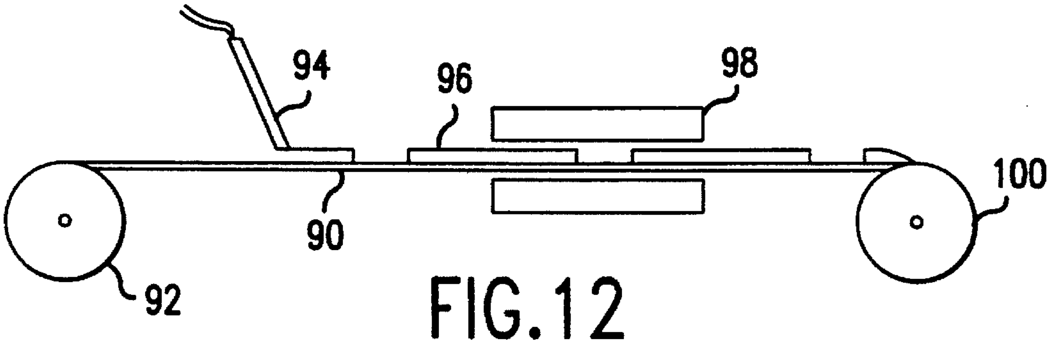
FIG. 12 is a diagrammatic elevation of an alternative apparatus for applying a pressure-sensitive adhesive to a release material for use in the present invention.

An alternative embodiment of the present invention will now be described with reference to FIG. 12. FIG. 12 is similar to FIG. 1 and shows a web of siliconised release material 90 being fed out from a reel 92 thereof underneath an adhesive coating head 94. The adhesive coating head 94 is adapted to apply to the upper surface of the release material 90 successive patches of pressure-sensitive adhesive 96. The release material 90 and the pressure-sensitive adhesive 96 are similar to those employed in the method of the previously described Figures. The release material 90 having the patches of pressure-sensitive adhesive 96 applied thereto is passed through a cooling station 98 in which the pressure-sensitive adhesive in "cured" as described above and is then wound up onto a reel 100. The reel 100 may be used in any of the apparatus of FIGS. 2, 8, 9, 10, or 11 instead of the reel 12, with each of those apparatus being modified so that each label 16 is applied to a respective patch of pressure sensitive adhesive 96. The patches 96 are larger than the labels 16 so as to ensure that the labels 16 are fully adhered over all their rear face to the release material and so that each label 16 is surrounded by a waste portion of the pressure-sensitive adhesive. This alternative arrangement has the advantage of a reduction in the amount of pressure-sensitive adhesive which is employed compared to the arrangement shown in FIG. 1.

Figure 13:
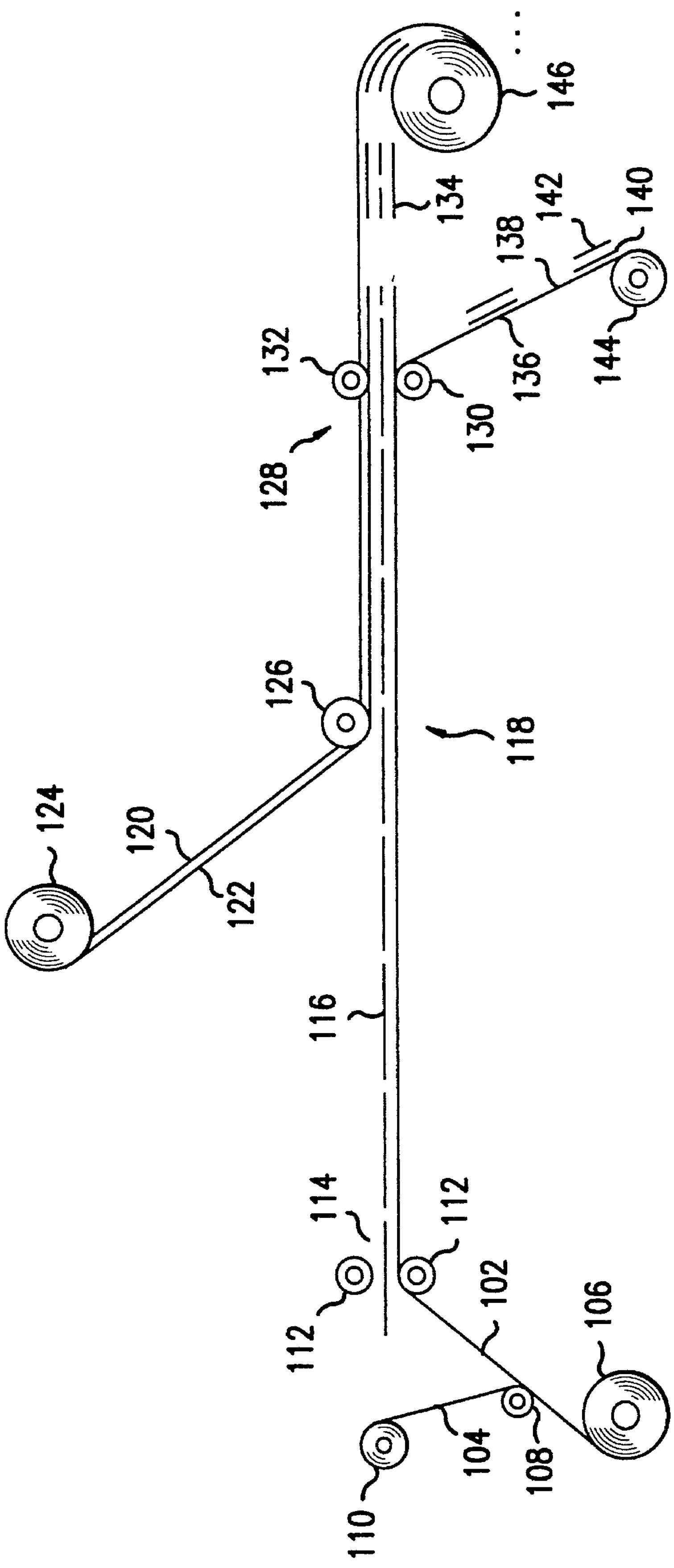
FIG. 13 is a diagrammatic elevation of an apparatus for producing self-adhesive labels in accordance with a seventh embodiment of the present invention.

FIG. 13 shows a further apparatus for producing labels in accordance with the present invention. A web 102 of self-adhesive plastics material, which is preferably a transparent polyester, is carried on a release backing material 104. The combined web 102 and release backing material 104 are fed from a supply reel 106 to a roller 108 at which the release backing material 104 is separated from the web 102 of self-adhesive plastics material and is wound up on a take-up reel 110. The web 102 of self-adhesive plastics material then passes between a pair of nip rollers 112 forming a label applying station 114.

At the label applying station 114, lithographically printed sheets 116 are fed in succession to the nip rollers 112 by means not shown and the nip rollers 112 apply the succession of printed sheets 116 to the self-adhesive surface of web 102 of self-adhesive plastics material. The lithographically printed front surface of each printed sheet 116 is adhered to the self-adhesive surface of the web 102 of plastics material. The printed sheets 116 are applied in succession so as to be in abutting relationship along the length of the web 102. However, if desired, a space may be provided between adjacent printed sheets 116.

The web 102 of plastics material with the succession of printed sheets 116 thereon is then conveyed to a release material applying station 118. A release material 120 which has been coated with a layer of pressure-sensitive adhesive 122 in the manner described hereinabove is fed out from a reel 124 thereof. The reel 124 is the same as the reel 12 of FIG. 2. At the release material applying station 118, a roller 126 is applied against the rear face of the release material 120 and thereby pushes the layer of pressure-sensitive adhesive 122 against the succession of printed sheets 116 which are carried on the web 102 of self-adhesive plastics material. In this way, the succession of individual printed sheets 116 is applied to the layer of pressure-sensitive adhesive 112 so as to adhere the printed sheets to the release material 120.

The composite web assembly then passes to a die-cutting station 128. The die-cutting station 128 includes a die-cutting roller 130 and a backing roller 132 between which the composite web assembly is passed. The die-cutting roller 130 is mounted on that side of the composite web assembly which is formed by the web 102 of self-adhesive plastics material and the backing roller 132 is mounted on the other side of the composite web assembly which is formed by the release material 120. The die-cutting roller 130 cuts through the web 102 of self-adhesive plastics material, the applied printed sheets 116 and the layer 122 of pressure-sensitive adhesive as far as, but not through, the release material 120, so as to form a succession of spaced labels 134 which are carried on the release material 120. Specifically, the die-cutting roller 130 cuts out a central portion of each applied printed sheet 116, together with the associated portions of the layer of pressure-sensitive adhesive 122 of the self-adhesive plastics material 102. The waste web remnant 136, consisting of those portions 138 of the self-adhesive plastics material 102 which lie outside the die-cut labels 104, the waste portions 140 of the printed sheets 116 and the waste portions 142 of the layer of pressure-sensitive adhesive 122, is removed and wound up on a take-up roll 146. In this way, the waste portions 140 of the applied printed sheets and the waste portions 142 of the layer of pressure-sensitive adhesive which surround the die-cut self-adhesive labels 134 are removed from the release material 120.

The release material 120 with the succession of self-adhesive lables 134 thereon is wound up into a reel 146.

Although the present invention has been described as relating to the application of lithographically printed sheets to the release material, nevertheless the present invention may also be employed to adhere other types of label 16 to the release material. The pre-printed labels 16 may alternative be multiple-ply labels as disclosed in British Patent Specification No. 2115775 and in British Patent Specification No. 2141994.

Furthermore, if desired, the applied labels 16 may consist of a plurality of individual labels which are united together with those individual labels being spaced transversely across the release material 2. In the die-cutting step, the die-cutting roller 28 cuts the applied labels longitudinally and thereby separates each applied label into the plurality of separate individual labels.

What I claim is:

1. A method of producing a succession of self-adhesive labels on a length of release material, which method comprises the steps of:

(a) applying a layer of pressure-sensitive adhesive directly to a surface of a length of release material;

(b) applying a succession of individual labels directly to the layer of pressure-sensitive adhesive so as to adhere the labels to a release material;

(c) cutting through each of the labels and layer of pressure-sensitive adhesive as far as the release material thereby to form self-adhesive labels; and (d) removing waste portions of the applied labels and waste portions of the pressure-sensitive adhesive which surround the self-adhesive labels from the release material wherein prior to removing step (d) the pressure-sensitive adhesive is in the form of a coherent film which can be pulled away from the release material without tearing and wherein in removing step (d) the said waste portions are removed from the release material by pulling away from the release material the waste portion of the film of pressure-sensitive adhesive, and the label waste portions which are adhered thereto.

2. A method according to claim 1 wherein the waste portion of the film of pressure-sensitive adhesive is separated from the release material by means of a suction roller which sucks the film away from the release material.

3. A method according to claim 1 wherein the waste portion of the film of pressure-sensitive adhesive is separated from the release material by being pulled against a silicone coated roller.

4. A method of producing a succession of self-adhesive labels on a length of release material, which method comprises the steps of:

(a) applying a layer of pressure-sensitive adhesive directly to a surface of a length of release material;

(b) applying a succession of individual labels carried on a web of self-adhesive laminar material, a front face of each label being adhered to the self-adhesive surface of the laminar material, directly to the layer of pressure-sensitive adhesive so as to adhere the labels to the release material wherein said labels are carried on said web of self-adhesive laminar material prior to being adhered to said release material;

(c) cutting through each of the labels in the layer of pressure-sensitive adhesive as far as the release material thereby to form self-adhesive labels, whereby each self-adhesive label incorporates a co-extensive portion of the laminar material; and (d) removing waste portions of the applied labels and waste portions of the pressure-sensitive adhesive which surround the self-adhesive labels from the release material by pulling away that part of the laminar material which surrounds the self-adhesive labels, thereby removing from the release materials said waste portions of the applied labels and pressure-sensitive adhesive which are adhered to the laminar material.

5. A method of producing a succession of self-adhesive labels on a length of release material, which method comprises the steps of:

(a) applying a layer of pressure-sensitive adhesive directly to a surface of a length of release material;

(b) applying a succession of individual labels directly to the layer of pressure-sensitive adhesive so as to adhere the labels to a release material;

(c) cutting through each of the labels and layer of pressure-sensitive adhesive as far as the release material thereby to form self-adhesive labels; and (d) removing waste portions of the applied labels and waste portions of the pressure-sensitive adhesive which surround the self-adhesive labels from the release material wherein prior to removing step (d) the pressure-sensitive adhesive is in the form of a coherent film which can be pulled away from the release material without tearing.

6. A method of producing a succession of self-adhesive labels on a length of release material, which method comprises the steps of:

(a) applying a layer of pressure-sensitive adhesive directly to a surface of a length of release material;

(b) applying a succession of individual labels directly to the layer of pressure-sensitive adhesive so as to adhere the labels to the release material;

(c) cutting through each of the labels and the layer of pressure-sensitive adhesive as far as the release material, thereby to form self-adhesive labels;

(d) removing waste portions of the applied labels and waste portions of the pressure-sensitive adhesive which surround the self-adhesive labels from the release material; and (e) applying to the layer of pressure-sensitive adhesive on opposing sides of the succession of labels a pair of elongate strips;

wherein in the removing step (d) the strips are pulled away from the release material and thereby remove from the release material said waste portions of the applied labels and pressure-sensitive adhesive which are adhered thereto.

7. A method of producing a succession of self-adhesive labels on a length of release material, which method comprises the steps of:

(a) applying a layer of pressure-sensitive adhesive directly to a surface of a length of release material;

(b) applying a succession of individual labels directly to the layer of pressure-sensitive adhesive so as to adhere the labels to the release material;

(c) cutting through each of the labels and the layer of pressure-sensitive adhesive as far as the release material, thereby to form self-adhesive labels;

(d) applying to the succession of cut labels on the release material which is formed in step (c) an elongate web whereby the elongate web is adhered to the release material by those parts of the layer of pressure-sensitive adhesive which are not covered by the applied labels; and (e) removing from the release material said waste portions of the pressure-sensitive adhesive which are adhered thereto and said waste portions of said applied labels by pulling away from the release material the elongate web.

* * * * *